United States Patent
Osenar et al.

(10) Patent No.: US 7,297,269 B2
(45) Date of Patent: Nov. 20, 2007

(54) CROSS-FLOW FILTRATION CASSETTES AND METHODS FOR FABRICATION OF SAME

(75) Inventors: Paul Osenar, Westford, MA (US); Paul Sabin, Needham, MA (US)

(73) Assignee: Protonex Technology Corporation, Southborough, MA (US)

( * ) Notice: Subject to any disclaimer, the term of this patent is extended or adjusted under 35 U.S.C. 154(b) by 264 days.

(21) Appl. No.: 10/976,374

(22) Filed: Oct. 28, 2004

(65) Prior Publication Data

US 2005/0173330 A1   Aug. 11, 2005

Related U.S. Application Data

(60) Provisional application No. 60/515,995, filed on Oct. 31, 2003.

(51) Int. Cl.
*B01D 63/00* (2006.01)
*B05C 5/02* (2006.01)
*B01D 61/00* (2006.01)

(52) U.S. Cl. .......................... 210/321.75; 210/321.84; 210/331; 422/101; 156/356; 264/DIG. 48

(58) Field of Classification Search ............... None
See application file for complete search history.

(56) References Cited

U.S. PATENT DOCUMENTS

| | | |
|---|---|---|
| 4,715,955 A | 12/1987 | Heckmann et al. |
| 4,735,718 A | 4/1988 | Peters |
| 5,342,517 A | 8/1994 | Kopf |
| 5,599,447 A | 2/1997 | Pearl et al. |
| 5,824,217 A * | 10/1998 | Pearl et al. ............. 210/321.75 |
| 5,922,200 A | 7/1999 | Pearl et al. |
| 6,171,374 B1 | 1/2001 | Barton et al. |
| 2002/0068212 A1 | 6/2002 | Osenar et al. |
| 2003/0096153 A1 | 5/2003 | Osenar et al. |
| 2003/0178358 A1 | 9/2003 | Osenar et al. |

FOREIGN PATENT DOCUMENTS

| | | |
|---|---|---|
| WO | WO-02/093668 A1 | 11/2002 |
| WO | WO-02/093672 A2 | 11/2002 |

* cited by examiner

*Primary Examiner*—Krishnan S. Menon
(74) *Attorney, Agent, or Firm*—Linda M. Buckley; Christine C. O'Day; Edwards Angell Palmer & Dodge LLP

(57) ABSTRACT

This invention relates generally to filtration cassettes, and, more particularly to methods of fabricating cross-flow filtration cassettes. Cassettes of the invention are characterized, in part, by a series of sealing channels which selectively seal the filtrate and retentate ports to prevent undesired flow. The sealing channels have formed barriers on either side thereof which create side-walls for precisely controlling the flow of the sealant during the cassette formation. Filtration cassettes of the present invention can be manufactured from conventional membrane and flow screen components and can utilize both injection molding and vacuum assisted resin transfer molding fabrication processes.

27 Claims, 2 Drawing Sheets

IMPROVED ONE-SHOT FILTER FLOWFIELD DESIGN

ONE-SHOT FILTER FLOWFIELD DESIGN

IMPROVED ONE-SHOT FILTER FLOWFIELD DESIGN

ONE-SHOT CHANNEL SIDE VIEW

ONE-SHOT CHANNEL IMPROVEMENT
SIDE VIEW

CROSS-FLOW FILTRATION CASSETTES AND METHODS FOR FABRICATION OF SAME

This application is a continuation of provisional application U.S. Ser. No. 60/515,995, filed Oct. 31, 2003.

BACKGROUND OF THE INVENTION

1. Field of the Invention

This invention relates generally to filtration cassettes, and, more particularly to methods of fabricating cross-flow filtration cassettes. Cassettes of the invention are characterized, in part, by a series of sealing channels which selectively seal the filtrate and retentate ports within the cassettes and prevent undesired flow. Methods of the invention produce filtration cassettes with an increased active filter surface area. Additionally, the present invention allows for the fabrication of filtration cassettes with a minimum of labor and at a reduced cost.

2. Background

Filtration cassettes are used in a variety of biotechnology and food processing applications. These cassettes typically comprise a stacked assembly of porous membrane components and filtrate and retentate flow screen components. During cross-flow filtration, a suspension is continually pumped into the retentate ports and through the cassette. Product that passes through the membrane is collected and passed out, e.g., drained, through the filtrate ports.

Filtration cassettes have conventionally been made using a multi-step process (see, e.g., U.S. Pat. No. 4,715,955). Generally, unused manifold ports on each of the individual flow screens (e.g., filtrate and retentate) are sealed. For example, in the case of the filtrate flow screen, ports utilized for the distribution of retentate on other layers must be sealed about their perimeter to prevent mixing. This step can also be accomplished while binding one or more flow screens to the filtration membrane layer in the production of a subassembly. By either mode, a fixture is required to hold the flow screen in place and introduce resin and vacuum appropriately.

Next, component membranes or subassemblies and flow screens which have been sealed as described above are layered within a mold or other fixture according to the design requirements for the finished filtration cassette. Once the components have been assembled within the mold, a resin is introduced about the periphery. Using conventional vacuum transfer molding techniques, the resin is drawn into the edges of the cassette assembly. Once hardened, the resin provides structural support and edge sealing around the cassette.

The resulting fabricated filtration cassette may then be utilized for its intended application by fixing it between end plates, which provide appropriate manifolding and a means of compression. The compression allows sealing between the filtration cassette and the manifold within the endplate, as well as sealing between the components of the cassette itself. This conventional fabrication process is time intensive, costly and cannot be easily automated. Further, the compression required for sealing of the fabricated cassette, both between components and between the cassette and the manifolds within the end plate, results in reduced seal reliability.

World Publication WO 03/080226, the entirety of which is hereby incorporated by reference, details our own advancements in the field. In that publication, we describe a novel filtration cassette and related manufacturing method which offer, among other benefits, a substantial reduction in time and cost of assembly. Cassettes reported therein are characterized, in part, by a series of sealing channels which selectively seal the filtrate and retentate ports and prevent undesired flow. That feature eliminates the need for a separate step to seal individual components prior to assembly of the filtration cassette.

Despite even our own advancements in the field, there remains a need for other improved cassette designs. For instance, it would be highly desirable to develop filtration cassettes which offer an increased active filter surface area (e.g., having a reduced surface area devoted to sealing channels, manifolding and/or other structures). It also would be highly desirable to develop new filtration cassettes and methods which produce repeatable sealing geometry without requiring a precise vacuum (or pressure).

SUMMARY OF THE INVENTION

The present invention provides substantially improved filtration cassettes with an increased active filter surface area and a highly efficient sealing space. Utilizing methods of the invention, a precise vacuum (or pressure) is not required to achieve repeatable sealing geometry within the cassettes.

The present invention builds on our own innovation described in WO 03/080226. As reported therein, sealant flow can be controlled by cutting channels in screen-based flow fields. In that way, sealant flows preferentially where the screen has been cut away (to the desired port, e.g., retentate port or filtrate port). However, utilizing that design some sealant will still flow, albeit at a reduced rate, into the screen flow field. This flow into the screen creates a large area filled by sealant which consequently is not usable for filtration. Increased filtration area is particularly desirable, for example, in that it decreases filtration time for any given process.

According to the present invention, sealing channels are made in the screen not by a cutting process, but by a forming operation that creates side-walls for precisely controlling the flow of the sealant. In contrast to cassettes and methods of the prior art, temperature and/or pressure are used in the present invention to form sealing channels and associated barriers on either side of the channels. In preferred embodiments of the invention, sealing channels are formed by pressing the screen in a heated die, or using an ultrasonic welding horn, hot/heated knife, laser device or the like, to produce the desired geometry. As the skilled artisan will appreciate, using methods of the invention, there are a number of ways to produce a variety of suitable channel geometries with formed barriers on either side of the channels to achieve optimal performance in the sealing process.

The present invention allows for the fabrication of filtration cassettes with a minimum of labor and at a reduced cost. Cassettes and methods of the invention also are well suited for process automation.

Other aspects of the invention and related methods are discussed infra.

DETAILED DESCRIPTION OF THE INVENTION

Figure 1A:
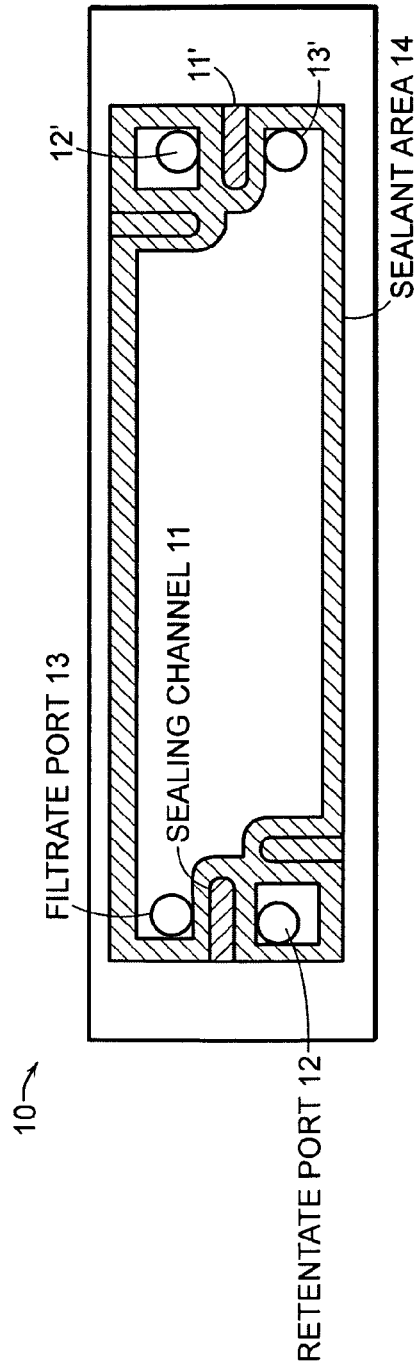
FIG. 1A is a top view of a flow field design for use in the filtration cassette described in WO 03/080226.

As discussed above, the present invention provides improved cross-flow filtration cassettes and novel methods for their fabrication. Cassettes and methods of the invention feature sealing channels made in the respective flow screens not by a cutting process, but by a forming operation that creates side-walls for precisely controlling the flow of the sealant. Using methods of the invention, there are a number of ways to produce acceptable channel geometry with formed barriers on either side of the channel.

Cassettes and methods of the invention offer numerous advantages over conventional assemblies, the most notable of which include the following:

1. A precise vacuum/pressure is not required to obtain repeatable sealant flow. Therefore, manufacturing is more repeatable and robust.
2. A smaller area of the filtration cassette is utilized for sealing, thus leaving more usable area for filtration.
3. Greater control of the sealant, e.g., silicone, flow allows more precise control of filtrate and retentate flow.
4. Less sealant can be used in the assembly, thereby reducing the overall cost.

According to the more typical filtration cassettes of the prior art, the filtrate flow screen, retentate flow screen and membrane components contain ports to allow for filtrate and retentate flow through the cassette. Typically, two sets of ports are cut for the manifolding of each of the filtrate and retentate flows (e.g., at least one inlet and at least one outlet for each flow). On the filtrate and retentate flow screens, sealed ports are utilized to prevent undesirable flow, e.g., into the wrong flow screens. In the prior art, all ports are cut into individual flow screens and one or more such flow screens are stacked within a mold. Ports which are to remain unsealed are closed off and sealant is introduced into the mold. A vacuum is applied to pull the sealant into the porous flow screens and seal the open ports on such flow screens. Separately, filtration membranes and appropriately sealed filtrate and retentate screens are stacked and edge encapsulated.

As stated above, the present invention utilizes our earlier innovation in that sealing of the unused ports of each component is achieved simultaneously and in conjunction with the edge encapsulation of the filtration cassette, either using injection molding or vacuum resin transfer molding techniques. Building on that innovation, we discovered that modifying the sealing channel geometry would further enhance performance of the cassettes. In particular, the sealing channels of the present invention are made in the screen not by cutting, but by a forming operation that creates side-walls which precisely control the flow of the sealant. Temperature and/or pressure are used to cut sealing channels and form barriers (also referred to herein as "thermoformed barriers") on either side of a channel. In particular, the sealing channels may be formed by pressing the screen in a heated die, or by using an ultrasonic welding horn, hot/heated knife, laser device or the like, to produce the desired geometry.

Referring now to the drawings of the application, FIG. 1A shows a filter flow field design 10 as reported in WO 03/080226. Sealing channels 11 and 11' surround retentate ports 12 and 12' (leaving filtrate ports 13 and 13' open to flow). Sealant area 14 is shown about the periphery of the component.

Figure 1B:
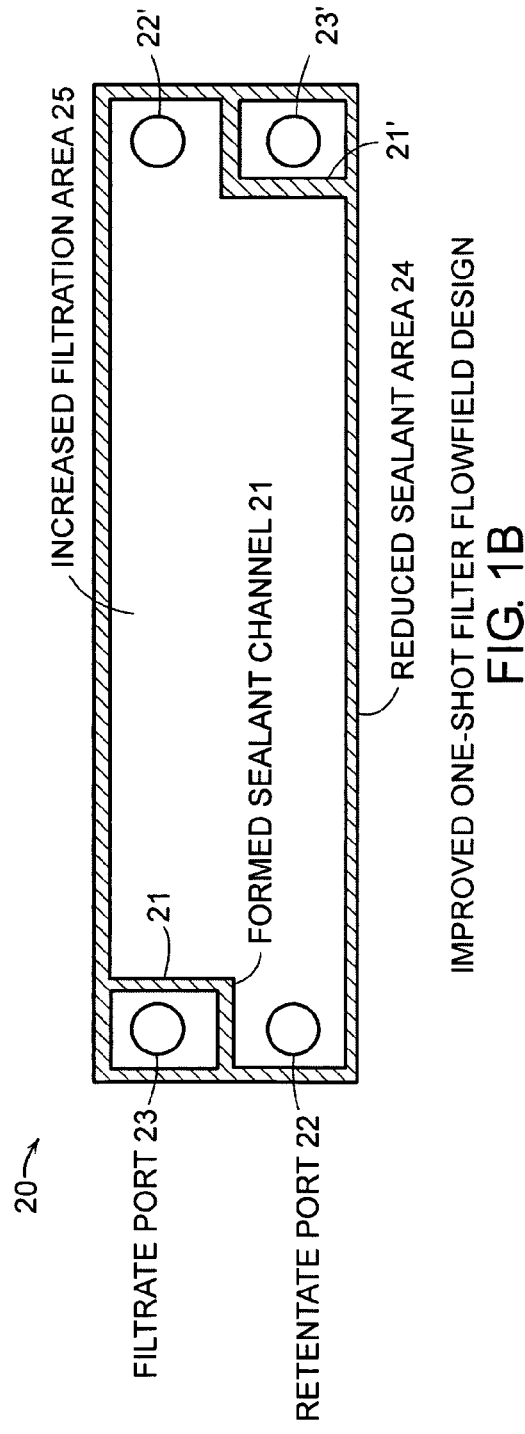
FIG. 1B is a top view of a preferred flow field design for use in filtration cassettes of the present invention.

FIG. 1B shows a preferred embodiment of a filter flow field design 20 of the present invention. Sealing channels 21 and 21' surround filtrate ports 23 and 23' (leaving retentate ports 22 and 22' open to flow). By way of further illustration, in the case of the retentate flow screen shown in FIG. 1B, the retentate ports remain open after encapsulation of the cassette, while the filtrate ports have been closed (via the channels and barriers) on this particular component/layer. In that way, those ports which are intended to be closed are selectively blocked by sealing of the respective channels in proximity to those ports.

Referring to both FIGS. 1A-1B, the encapsulated portion (which includes sealant area 24 and area devoted to sealing channels 21 and 21') of FIG. 1B shows a significantly reduced sealant area as compared to the encapsulated portion of FIG. 1A (which includes sealant area 14 and area devoted to sealing channels 11 and 11'). This feature provides a significantly increased active surface area of the cassette which may be utilized for filtration; see, e.g., the increased filtration area 25 shown in FIG. 1B. As the skilled artisan will appreciate, the percent of reduction in sealant area will vary widely, as it will be largely dependent upon the size of the cassette and porting geometry.

Figure 2A:
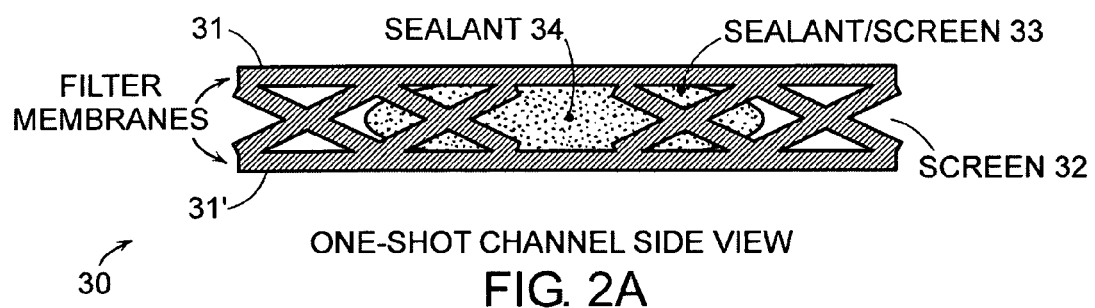
FIG. 2A is a side view of a sealing channel for use in the filtration cassette described in WO 03/080226.
Figure 2B:
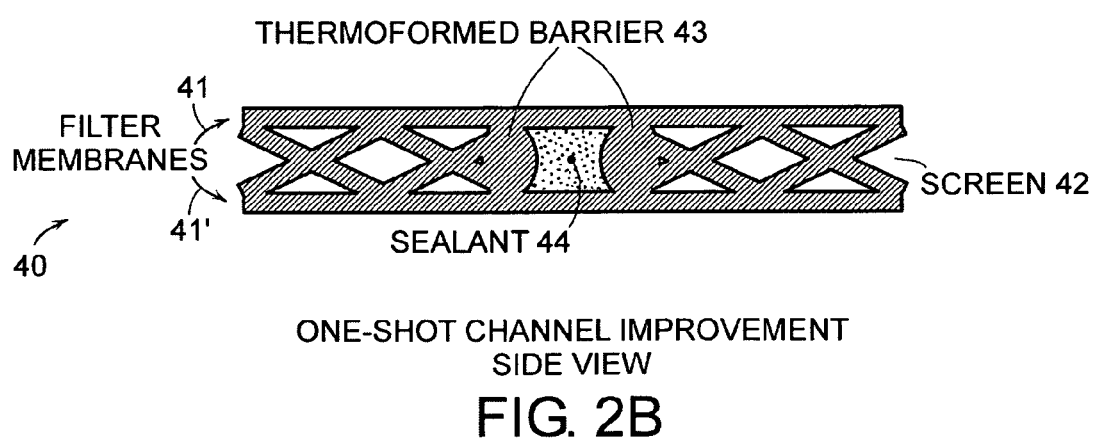
FIG. 2B is a side view of a sealing channel formed via preferred methods of the present invention.

FIGS. 2A-2B further illustrate the distinctions (and advantages) of the present invention as compared to the closest prior art, e.g., that described in WO 03/080226. For example, FIG. 2A shows a side view of one embodiment 30 of filter membranes 31 and 31' having a screen 32 interposed there between. As shown, a comparatively significant portion of sealant 34 flows into the screen. In contrast, FIG. 2B shows a side view of one embodiment 40 of filter membranes 41 and 41' having a screen 42 interposed there between. As shown, a significantly reduced portion of sealant 44 flows into the screen during the sealing process. That reduced flow is attributed to the thermoformed barriers 43 surrounding the sealing channels.

Preferred methods for fabricating a filtration cassette of the invention generally comprise providing one or more filter membranes, each having at least one port for filtrate flow and at least one port for retentate flow; providing one or more filtrate flow screens, each having at least one port for filtrate flow and at least one port for retentate flow and further having one or more channels formed via the barriers described above in proximity to and at least partially surrounding the port for retentate flow; and providing one or more retentate flow screens, each having at least one port for filtrate flow and at least one port for retentate flow and further having one or more channels formed via the barriers described above in proximity to and at least partially surrounding the port for filtrate flow. The components of the filtration cassette (filter membrane, filtrate flow screen and retentate flow screen) are stacked in a number and manner of assembly which reflects the desired output/cassette design. Encapsulation of the components of the filtration cassette is then achieved by introducing a sealant about the periphery of the filter membrane, the filtrate flow screen, and the retentate flow screen. The sealant contemporaneously seals the respective channels of these components.

In preferred embodiments of the present invention, each of the filter membranes, filtrate flow screens and retentate flow screens will comprise at least two ports for filtrate flow and at least two ports for retentate flow. As will be appreciated by the skilled artisan, one of the two ports provides access for "in-flow", while the other accommodates "out-flow".

Filtrate and retentate flow screens of the present invention are preferably cut from a woven or mesh material, including but not limited to polyester, polypropylene, other plastics, and the like. Indeed, any form which will allow fluid flow to travel parallel and through the sceen will be generally suitable for use in accordance with the invention.

As will be appreciated by the skilled artisan, filter membranes of the present invention are cut from a variety of membrane materials known in the art. By way of illustration, the example below utilizes a porous backed polysulfone membrane. In that way, a non-woven material may be utilized as a backing which provides strength and serves as a carrier. Preferred membrane filters include ultrafiltration, microporous, nanofiltration or reverse osmosis filters formed from polyvinylidene fluoride (PVDF), polysulfone, polyethersulfone, regenerated cellulose, polyamide, polypropylene, polyethylene, polytetrafluoroethylene, cellulose acetate, polyacrylonitrile, vinyl copolymer, polycarbonate, blends thereof or the like. In a particularly preferred embodiment of the invention, filter membranes are cut from porous polymer material, such as polysulfone membranes made via casting and quenching techniques (i.e., phase inversion), track etched polycarbonates, or other similar materials.

Preferably, all of the components are cut to roughly the same shape and perimeter. Ports are cut in the filter membrane and flow screens to provide manifolding for filtrate flow and retentate flow through the resulting cassette.

In the present invention, the sealing channels also are formed in each of the filtrate flow screens and retentate flow screens through which a sealant can travel or otherwise be guided from the edge of the flow screens to close off unused ports, contemporaneously with the encapsulation of the edge of the filtration cassette. Using the shape and placement of the channels in each of the components, sealant flow into the component is controlled. Specifically, the sealant flows faster in the open areas defined by the channels in each component than through the remainder of the component. Channels are not formed for ports that are not to be sealed on the individual component.

Depending upon the length of the channels and flow screen geometry (e.g., spacing and diameter of the mesh weave), sealant flow from the edge may be undesirable or not adequate to completely seal off the port. In such instances, one or more (optional) sealant holes may be cut, e.g., with a standard blade or otherwise formed (using the methods described herein) into the screen components. It is generally preferred that the sealant holes be cut or formed subsequent to the formation of the channels. The sealant holes are utilized to enhance sealing of the channels in that they draw or otherwise permit entry of additional sealant into the channels. (The feature of sealant holes is further described in our World Publication WO 03/080226.)

Once suitable sealing channels are formed in each of the components as described above, the components are assembled according to the desired filtration cassette design and output requirements. A very basic design would include a first filtrate flow screen, a first filter membrane, a retentate flow screen, a second filter membrane and a second filtrate flow screen. However, those skilled in the art will recognize that filtration cassettes can have any desired number of flow screens and filter membrane components assembled together.

Regardless of the particular design, the components are assembled such that the ports of each component in the assembly are aligned with the ports of the other components. The assembly is then placed within a mold or cavity and held in place within the mold by a top plate with an appropriate means of compression, such as a simple clamp or bolt pattern.

To encapsulate the filtration cassette assembly described above using vacuum resin transfer molding techniques, a sealant is introduced about the periphery and into any sealant holes of all assembled components. A vacuum is pulled through each of the ports within the assembly. The pressure differential pulls sealant into the edges of the assembly thereby encapsulating all the edges of the components in the assembly together and forming the assembly into a filtration cassette. In addition, the same pressure differential pulls the sealant from the edge into the channels cut in each of the flow screen components. The edge encapsulation and port sealing is complete when the sealant flows through the channels to meet and seal off the appropriate ports.

Throughout the cassette assembly, each flow screen is appropriately sealed such that only the manifold ports of interest remain open on each individual layer. The remaining ports are enclosed by the channels that are now sealed. The edges of the assembly also are encapsulated by sealant. The pressure differential and time required to accomplish the sealing process is a function of the materials used for the flow screen, membrane components and the sealant, including but not limited to mesh size of the screen, as well as the viscosity and flow characteristics of the sealant.

To encapsulate a filtration cassette of the present invention using injection molding techniques, sealant is injected around the periphery of the assembly and into any sealant holes using a driving pressure means. In the preferred embodiment, a thermoplastic resin is utilized as the sealant and is injected into the injection holes and around the edges of the assembly and allowed to cool and harden prior to removal of the filtration cassette from the mold. A mold capable of accommodating the associated temperature and pressure is utilized.

The sealant used for encapsulation and port sealing is selected such that it has the required chemical and mechanical properties for the conditions found in an operating filtration system, including but not limited to low leachables, temperature stability, and solvent compatibility. Suitable sealants include both thermoplastics and thermoset elastomers. Preferred thermoplastics include thermoplastic olefin elastomers, thermoplastic polyurethane, plastomer, polypropylene, polyethylene, polytetrafluoroethylene, fluorinated polypropylene and polystyrene. Preferred thermoset elastomers include epoxy resins, urethanes, silicones, fluorosilicones, and vinyl esters.

End plates may be bonded directly to the filtration cassette during the encapsulation step, thereby producing an entire stack (e.g., filtration cassette and end plates). Rather than using a removable means of compression in the encapsulation step, the top and bottom plates of the mold can be replaced with end plates. Upon encapsulation, end plates are incorporated into the filtration cassette.

Several benefits result from the bonding of the end plates directly to the filtration cassette. For instance, removing the need to compress the filtration cassette between end plates significantly improves the reliability of the filter. Also, the incorporated end plates can include fittings to further simplify the filter. In addition, the bonded filtration cassette and end plate assembly could be made disposable, thereby eliminating the need for fixed hardware end plates and their cleaning and sterilization.

The preferred filtration cassette of the present invention is further illustrated by means of the following illustrative embodiment, which is given for purpose of illustration only and is not meant to limit the invention to the particular components and materials disclosed therein.

EXAMPLE

Channels can be cut in polyester or polypropylene mesh stock with a hot knife, whereby the edges of the material are simultaneously melted to create the barriers about the sealing channel. The fabrication of the filtration cassette would directly follow the example in WO 03/080226; however the sensitivity to exact time and pressure during the vacuum forming process would be considerably less.

The invention claimed is:

1. A filtration cassette comprising:
one or more filter membranes, each having at least one port for filtrate flow and at least one port for retentate flow;
one or more filtrate flow screens, each having at least one port for filtrate flow and at least one port for retentate flow and further having one or more sealing channels in proximity to and at least partially surrounding the port for retentate flow, wherein the one or more channels on the filtrate flow screen permit introduction of a sealant such that the port for retentate flow on the filtrate flow screen may be selectively blocked; and
one or more retentate flow screens, each having at least one port for filtrate flow and at least one port for retentate flow and further having one or more sealing channels in proximity to and at least partially surrounding the port for filtrate flow, wherein the one or more channels on the retentate flow screen permit introduction of a sealant such that the port for filtrate flow on the retentate flow screen may be selectively blocked;
wherein each of the sealing channels is surrounded by a formed barrier;
wherein the one or more filter membranes, filtrate flow screens and retentate flow screens are assembled and encapsulated about the periphery thereof by a sealant; and wherein the sealant contemporaneously seals the respective channels of the one or more filtrate flow screens and retentate flow screens to selectively block one or more ports in proximity thereto.

2. The filtration cassette of claim 1, wherein the sealing channels extend inward from the respective edges of the one or more filtrate flow screens and retentate flow screens.

3. The filtration cassette of claim 1, wherein the barriers are formed on either side of the channels by one or more of temperature and/or pressure.

4. The filtration cassette of claim 1, wherein the sealing channels are formed by pressing the screen in a heated die, or by using one or more of a heated knife, laser, or ultrasonic welding horn of the appropriate geometry.

5. The filtration cassette of claim 1, wherein each of the one or more filter membranes, filtrate flow screens and retentate flow screens further comprises one or more sealant holes to enhance sealing of the respective channels.

6. The filtration cassette of claim 1, wherein the ports of each of the filter membrane, filtrate flow screen and retentate flow screen components are in respective alignment with each other.

7. The filtration cassette of claim 1, wherein the filter membrane is positioned, respectively, between the filtrate flow screen and the retentate flow screen.

8. The filtration cassette of claim 1, further comprising a first and second end plate attached at either end thereof.

9. The filtration cassette of claim 8, wherein the first and second end plates are encapsulated into the cassette.

10. The filtration cassette of claim 1, wherein the filter membrane is selected from the group consisting of ultrafiltration, microporous, nanofiltration or reverse osmosis filters formed from polyvinylidene fluoride (PVDF), polysulfone, polyethersulfone, regenerated cellulose, polyamide, polypropylene, polyethylene, polytetrafluoroethylene, cellulose acetate, polyacrylonitrile, vinyl copolymer, polycarbonate, and blends thereof.

11. The filtration cassette of claim 1, wherein the filter membranes comprise a porous polymer material.

12. The filtration cassette of claim 11, wherein the porous polymer material comprises a polysulfone membrane.

13. The filtration cassette of claim 1, wherein the filtrate flow screens and retentate flow screens comprise a mesh material.

14. The filtration cassette of claim 13, wherein the mesh material comprises polyester or polypropylene.

15. The filtration cassette of claim 1, wherein the sealant is selected from the group consisting of thermoplastic materials and thermoset elastomers.

16. The filtration cassette of claim 15, wherein the thermoplastic material is selected from the group consisting of thermoplastic olefin elastomers, thermoplastic polyurethane, plastomer, polypropylene, polyethylene, polytetrafluoroethylene, fluourinated polypropylene and polystyrene.

17. The filtration cassette of claim 15, wherein the thermoset elastomers are selected from the group consisting of epoxy resins, urethanes, silicones, fluorosilicones, and vinyl esters.

18. The filtration cassette of claim 1, wherein each of the one or more filter membranes, filtrate flow screens and retentate flow screens are cut to roughly the same shape and perimeter.

19. A filtration stack assembly comprising one or more filtration cassettes and a first and second endplate attached at either end thereof, wherein each filtration cassette comprises:
one or more filter membranes, each having at least one port for filtrate flow and at least one port for retentate flow;
one or more filtrate flow screens, each having at least one port for filtrate flow and at least one port for retentate flow and further having one or more sealing channels in proximity to and at least partially surrounding the port for retentate flow, wherein the one or more channels on the filtrate flow screen permit introduction of a sealant such that the port for retentate flow on the filtrate flow screen may be selectively blocked; and
one or more retentate flow screens, each having at least one port for filtrate flow and at least one port for retentate flow and further having one or more sealing channels in proximity to and at least partially surrounding the port for filtrate flow, wherein the one or more channels on the retentate flow screen permit introduction of a sealant such that the port for filtrate flow on the retentate flow screen may be selectively blocked;
wherein each of the sealing channels is surrounded by a formed barrier; wherein the one or more filter membranes, filtrate flow screens and retentate flow screens are assembled and encapsulated about the periphery thereof by a sealant; and wherein the sealant contemporaneously seals the respective channels of the one or more filtrate flow screens and retentate flow screens to selectively block one or more ports in proximity thereto.

20. A method for fabricating a filtration cassette comprising:
providing one or more filter membranes, each having at least one port for filtrate flow and at least one port for retentate flow;
providing one or more filtrate flow screens, each having at least one port for filtrate flow and at least one port for retentate flow;
forming one or more sealing channels having a barrier on either side thereof in proximity to and at least partially surrounding the port for retentate flow on the one or more filtrate flow screens;
providing one or more retentate flow screens, each having at least one port for filtrate flow and at least one port for retentate flow;
forming one or more sealing channels having a barrier on either side thereof in proximity to and at least partially surrounding the port for filtrate flow on the one or more retentate flow screens; and
introducing a sealant about the periphery of the filter membrane, the filtrate flow screen, and the retentate flow screen to encapsulate the periphery thereof and to seal the respective channels.

21. The method of claim 20, wherein the sealing channels and barriers are formed by using one or more of temperature and/or pressure.

22. The method of claim 20, wherein the sealing channels are formed by pressing the screen in a heated die or by using one or more of a heated knife, laser or an ultrasonic welding horn of the appropriate geometry.

23. The method of claim 20, further comprising cutting or otherwise forming one or more sealant holes in each of the filter membrane, filtrate flow screen and retentate flow screen components to enhance sealing of the respective channels.

24. The method of claim 20, further comprising assembling the one or more filter membranes, filtrate flow screens and retentate flow screens such that their respective ports are in alignment prior to introducing the sealant about the periphery thereof.

25. The method of claim 20, wherein a series of filter membranes, filtrate flow screens and retentate flow screens are assembled such that each respective membrane filter is positioned between a respective filtrate flow screen and respective retentate flow screen.

26. The method of claim 20, further comprising attaching a first and second end plate at either end of the cassette thereof.

27. The method of claim 26, further comprising encapsulating the end plates into the cassette.

* * * * *